United States Patent
Mandyam et al.

(10) Patent No.: US 8,645,209 B2
(45) Date of Patent: Feb. 4, 2014

(54) REAL TIME USER ACTIVITY-DRIVEN TARGETED ADVERTISING SYSTEM

(75) Inventors: Srinivas A. Mandyam, San Jose, CA (US); Krishna Vedati, Sunnyvale, CA (US); David Lothele Williams, Belmont, CA (US)

(73) Assignee: Yellowpages.com LLC, Glendale, CA (US)

( * ) Notice: Subject to any disclaimer, the term of this patent is extended or adjusted under 35 U.S.C. 154(b) by 199 days.

(21) Appl. No.: 12/968,231

(22) Filed: Dec. 14, 2010

(65) Prior Publication Data

US 2012/0150645 A1   Jun. 14, 2012

(51) Int. Cl.
*G06Q 30/00*   (2012.01)

(52) U.S. Cl.
USPC ..................................................... 705/14.49

(58) Field of Classification Search
USPC ........................................................... 705/14
See application file for complete search history.

(56) References Cited

U.S. PATENT DOCUMENTS

| | | | |
|---|---|---|---|
| 7,403,908 B1 | 7/2008 | Jaramillo | |
| 7,693,752 B2 | 4/2010 | Jaramillo | |
| 7,743,056 B2* | 6/2010 | Meisels et al. | 707/731 |
| 7,848,764 B2* | 12/2010 | Riise et al. | 455/456.1 |
| 7,873,904 B2* | 1/2011 | Wang et al. | 715/715 |
| 8,265,995 B2* | 9/2012 | Blegen | 705/14.58 |
| 2002/0002552 A1* | 1/2002 | Schultz et al. | 707/3 |
| 2005/0076014 A1* | 4/2005 | Agarwal et al. | 707/3 |
| 2007/0192281 A1* | 8/2007 | Cradick et al. | 707/2 |
| 2007/0239452 A1* | 10/2007 | Madhavan et al. | 704/252 |
| 2008/0255935 A1* | 10/2008 | Madhavan et al. | 705/14 |
| 2009/0006311 A1* | 1/2009 | Ting et al. | 707/2 |
| 2009/0037296 A1 | 2/2009 | Jaramillo | |
| 2009/0089169 A1* | 4/2009 | Gupta et al. | 705/14 |
| 2009/0111487 A1* | 4/2009 | Scheibe | 455/456.6 |
| 2009/0149199 A1* | 6/2009 | Maghoul | 455/456.3 |
| 2009/0271368 A1* | 10/2009 | Channell | 707/3 |
| 2010/0041419 A1* | 2/2010 | Svendsen et al. | 455/456.3 |
| 2010/0049609 A1* | 2/2010 | Zhao et al. | 705/14.58 |
| 2010/0198655 A1* | 8/2010 | Ketchum et al. | 705/10 |
| 2010/0211432 A1* | 8/2010 | Yiu et al. | 705/10 |
| 2010/0299200 A1* | 11/2010 | Delli Santi et al. | 705/14.49 |
| 2010/0312646 A1* | 12/2010 | Gupta et al. | 705/14.58 |
| 2010/0331016 A1* | 12/2010 | Dutton et al. | 455/456.3 |
| 2012/0072287 A1* | 3/2012 | Crane et al. | 705/14.58 |
| 2012/0166416 A1* | 6/2012 | Murdock et al. | 707/711 |
| 2012/0166435 A1* | 6/2012 | Graham et al. | 707/728 |
| 2012/0221548 A1* | 8/2012 | Delli Santi et al. | 707/710 |
| 2012/0284118 A1* | 11/2012 | Mamich et al. | 705/14.52 |
| 2013/0006770 A1* | 1/2013 | Vengroff et al. | 705/14.54 |

* cited by examiner

*Primary Examiner* — Matthew L Hamilton
(74) *Attorney, Agent, or Firm* — Kilpatrick Townsend & Stockton LLP

(57) ABSTRACT

A system and method of delivering an advertisement to a target market, may comprise with at least one computing device, collecting data relating to consumer information gathering (accessing activity); analyzing the data relating to consumer information gathering, to determine a consumer interest trend; utilizing the consumer interest trend to define a target advertising market; and utilizing at least one communications channel delivering a selected advertisement related to the target advertising market to user devices within the target advertising market.

19 Claims, 3 Drawing Sheets

REAL TIME USER ACTIVITY-DRIVEN TARGETED ADVERTISING SYSTEM

FIELD

The disclosed subject matter relates to electronic advertising, particularly user activity, such as, search-volume/search-trend driven advertising.

BACKGROUND

An important business for a communication services provider can be advertising for local business users and other advertisers, such as interactive based searchable advertising. Display advertising can be an important factor in interactive based searchable advertizing, and, therefore, there is a need for the ability to combine the two types of services, e.g., on-line.

Display advertising is a type of advertising that typically contains text (i.e., copy), logos, photographs or other images, location maps, and similar items. In periodicals, display advertising can appear on the same page as, or on the page adjacent to, general editorial content. In contrast, classified advertising generally appears in a distinct section, is traditionally mostly text-only. Display advertisements are not required to contain images, audio, or video. Textual advertisements are also used where text may be more appropriate or more effective. An example of textual advertisements is commercial messages sent to mobile device users, emails, etc. Outside of the on-line environment, one common form of display advertising involves billboards.

Display advertising can also appear on the Internet, as a form of internet marketing. Display advertising appears on web pages in many forms, including web banners. These banners can consist of static or animated images, as well as interactive media that may include audio and video elements. Adobe Systems Flash or .gif are preferred presentation formats for such interactive advertisements. The Interactive Advertising Bureau, an industry trade group, sets some standards for online shapes and sizes.

BRIEF DESCRIPTION OF THE DRAWINGS

For a more complete understanding of the presently disclosed subject matter, reference is made to the following detailed description of exemplary embodiments considered in conjunction with the accompanying drawings, in which.

DETAILED DESCRIPTION OF EXEMPLARY EMBODIMENTS

Figure 1:
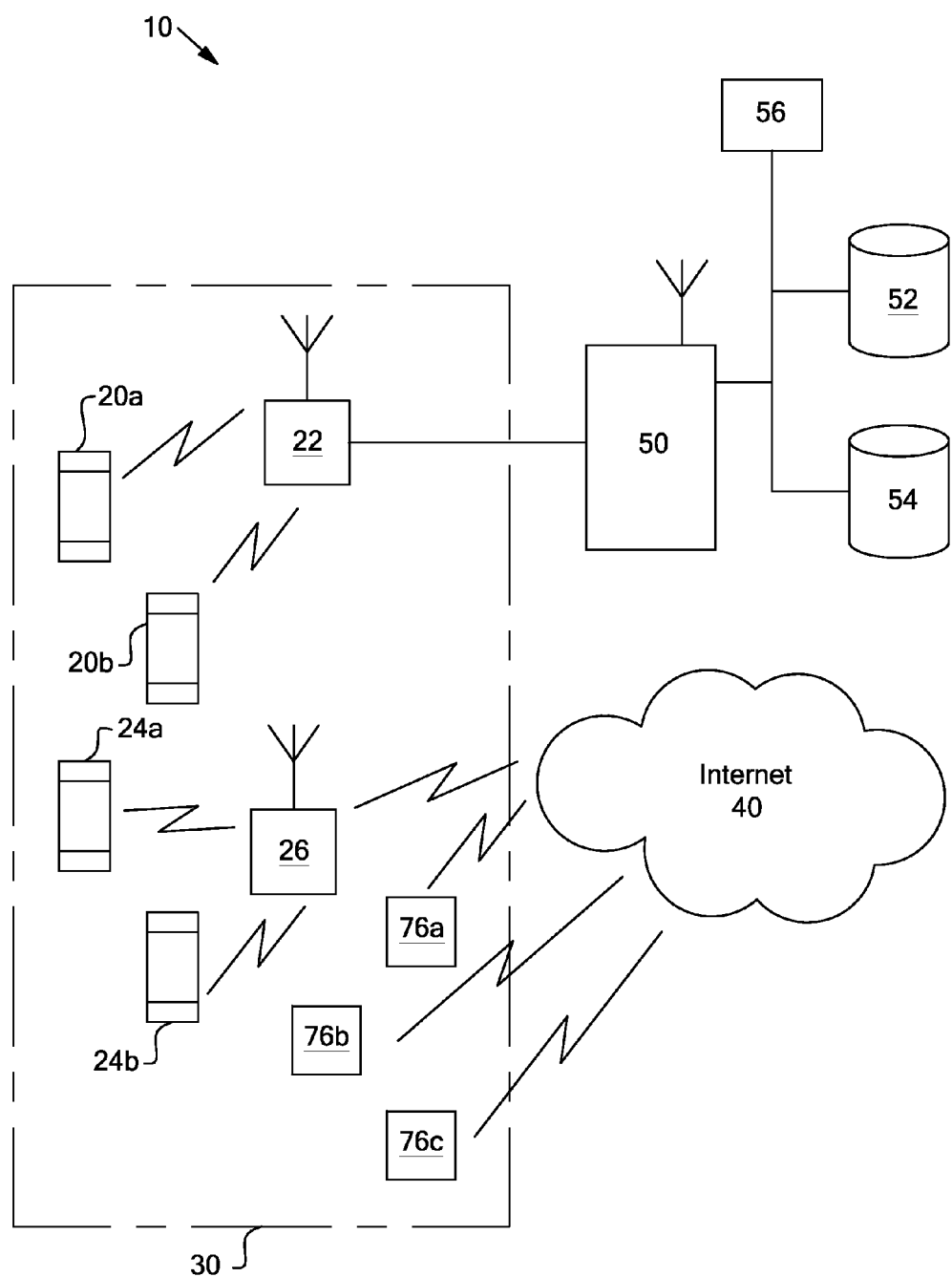
FIG. 1 shows schematically and partly in block diagram form a system according to aspects of embodiments of the disclosed subject matter.

The subject matter of the present application is described below with reference to block diagrams and operational illustrations (herein collectively "block diagrams") of methods and devices to select and present media related to a specific topic. It is understood that each block of the block diagram, and combinations of blocks in the block diagram, can be implemented by means of analog or digital hardware and computer program instructions.

These computer program instructions can be provided to a processor of a general purpose computer, special purpose computer, ASIC, or any other programmable data processing apparatus (herein "computing device"), such that the instructions, which execute, e.g., via the processor of the computing device, cause the computing device to perform the functions/acts specified in the block of the block diagram.

In some alternate implementations, the functions/acts noted in the blocks can occur out of the order noted in the block diagram. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single physical processor within a single computing device, with associated communications and data storage and database facilities, or it can refer to a networked or clustered complex of computing devices and associated network and storage devices, as well as operating software and one or more database systems and applications software, which support the services provided by the server.

For the purposes of this disclosure a non-transitory computer readable medium stores computer data, which data can include computer program code that is executable by a computing device, in a non-transitory machine readable form. By way of example, and not limitation, a computer readable medium may comprise non-transitory computer readable storage media, for tangible or fixed storage of data, or communication media enabling interpretation and storage of code-containing signals. Computer readable storage media, as used herein, refers to physical or tangible storage (as opposed to signals) and includes without limitation volatile and non-volatile, removable and non-removable media implemented in any method or technology for the non-transitory tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computing device.

For the purposes of this disclosure a module is a software, hardware, or firmware (or combinations thereof) system, process or functionality, or component thereof, that performs or facilitates the processes, features, and/or functions described herein in relation to a specific module (with or without human interaction or augmentation). A module can include sub-modules. Software components of a module may be stored on a computer readable medium. Modules may be integral to one or more computing devices or servers, or be loaded and executed by one or more computing devices or servers. One or more modules may be grouped into an engine or an application.

Applicants propose a mobile advertising system 10, as is illustrated schematically and in block diagram form in FIG. 1. The system 10 may target users utilizing user devices, such as, wireless receiver units 20*a* and 20*b*, or 24*a*, 24*b* or home computers, such as PCs 76*a-c*, by location. The location can be within some geographic area geographically defining a target market 30. Other pertinent factors may be used as well, such as, time or user history or intent, as well as also possibly employing a more detailed user profile. Applicants further propose, e.g., using a communications service provider's server 50 and its associated databases 52 and processor (computing device) 56 to discern consumer interest and intent. Discerning consumer interest and intent may be done by using, such as, current information, such as, information about consumer information gathering, e.g., user accessing activities, such as, key work searches sent to a search engine, which may be hosted by the server 50 and/or link-ins/log-ons, etc., which may be done through the server 50 (collectively "user accessing activities" as an aspect of "consumer information gathering"). It will be understood that the disclosed subject matter is being described in relation to a communications service provider server 50, which may be a wireless communications provider, such as may provide wireless connection to the remote devices 20a, 20b or 24a, 24b, through, respectively, base stations 22 and 26. However, the system is so described for illustration only and many more servers and computing devices and communications links may be incorporated into the system 10 and still function according to the basic principles identified herein with respect to the exemplary system 10.

The information gathered by the server 50 and stored, e.g., in the databases 52 or 54 or both, may relate, as an example, to a particular time and in a particular location, e.g., a geographic location. The information may then be used to inform what kinds of display advertisements and other advertisements are likely to be interesting to other users in, for example, a defined target market 30, e.g., at around that same time and in a defined location, such as a geographic location.

As an example, without limiting the disclosed embodiments, e.g., suppose that at some given time or time period, such as, lunchtime, in a given geographical location, such as in Sunnyvale Calif., there are a large number of searches (e.g., above some threshold amount in absolute numbers, or greater than a determined "normal" amount, or a definable trend toward either such amount, etc.) for a given kind of food or restaurant, such as, for "sushi." Then the system 10 according to aspects of an embodiment of the disclosed subject matter, can send to selected users (which could be all users or a sub-set of all users) in the target market, represented illustratively only by wireless remote units 20a and 20b along with wireless remote units 24a and 24b and computers 76a-c, an advertisement, e.g., a display advertisement for sushi restaurants. Or, as another possible example, suppose that in the week before Mother's Day, there occurs a large number of searches for "flowers" that is in some definable way indicative of consumer interest (e.g., above some threshold amount in absolute numbers, or greater than a determined "normal" amount, or some definable trend toward such amounts, etc.). Then the system 10, according to aspects of an embodiment of the disclosed subject matter, can send out advertisements, such as, display advertisements, for flower vendors to users in the so defined target market 30, as defined illustratively above.

In other words, as an example, a small percentage of the total possible advertisement viewing population, such as, the 1% of people who are at a given time searching for/linking-in to/logging-on to, etc. (herein collectively "accessing") sites for "sushi" or "flowers," can be utilized to drive the advertisements seen by the total possible advertising viewing population (or some specifically selected subset thereof) who are not then actively searching, but are within or otherwise identifiable to the target advertising market 30. It will be understood that those actively accessing may receive relevant advertising through other means than the disclosed subject matter of the present application, by virtue of being engaged in such accessing, such as advertising appearing on the search engine results page, and/or may also be included in the target market 30 defined according to aspects of an embodiment of the disclosed subject matter and receive the advertising directed in real time to the target market, e.g., on the same search engine results page, or otherwise.

Granularity of location of the defined target market 30 can be selected and adjusted, such as, dynamically adjusted. As an example, the system may choose to treat all of a given geographic locality, such as, the city of Sunnyvale, as a single location, or all of Silicon Valley geographically, or all of the State of California, or a definable group of states, such as the West Coast states, or the whole country, etc. The system 10 may select a geographic location for the target market by street, city, ZIP code, area code, county, state, or country, etc. The system 10 may select by a particular venue, e.g., a stadium or arena, and some surrounding region, such as within five miles or within ten miles, or within so many minutes of travel, e.g., by automobile, or within walking distance, etc.

Such granularity may be selected or dictated by an analysis of the incoming accessing requests and the then current location(s) of the users seeking such accessing (i.e., by conducting a search, by utilizing a link, or otherwise logging-on to a pertinent web-site or web-page, etc.). Location, such as geographic location, of such users may be obtained, such as, from records of registration of a computer used in the accessing (defined, e.g., by a URL address or cable internet service location identification), or may be obtained, e.g., from a GPS enabled mobile service remote unit, such as a wireless telephone device remote user device location system, or from mobile communication device triangulation location, or from the service area of a mobile communication system base station, etc.

Granularity of time can likewise be selected and adjusted, such as, dynamically adjusted. The illustrative server 50 of the system 10, e.g., utilizing traffic through the base stations 22 and/or 26 or otherwise received, such as over the Internet 40, and stored in one of both of the databases 52, 54, may segregate and analyze in the server 50 input information as to incoming access requests being received, e.g. by the minute, hour, day, week, month, year, or combinations thereof. The segregation and analysis may use suitable algorithms, such as, weighted averages of such data. By way of example and not limitation, a general number representing yearly data, with a low weight, another number based on the current month, with a somewhat higher weight, and a much higher weighted number(s) representing access requests received closer to real time, such as within the last hour or half-hour or minute, or a weighted average of these, etc. It will be understood that the data may be analyzed other than as to some amount at or above a selected threshold of consumer interest, but also as to change with time, e.g., of some short time periods, like minutes or hours, that demonstrate a trend toward some level of consumer interest that indicates through the analysis of, such as, the consumer information accessing activities ongoing, that exploitation of the defined target market by defined targeted advertising would be beneficial to the advertiser(s).

Additional information can be brought to bear, e.g., if users opt in, i.e., register to receive the service, such as by provision of user profiles (e.g., age, gender, family status, etc.) and past behavior (including past searches and purchases, and saved coupons, etc.), which also may be stored in one or more of the databases 52, 54. As an example, if a particular user is identifiable by the system as a vegetarian, then the "sushi" ad can be blocked from being provided.

Granularity could be adjusted in regard to this personal information as well. However, even without this additional personal information (and the additional opt-ins that it could require), the claimed subject matter can be useful, based just on information about the time and location of a user in the act of accessing definable information (i.e., defined by a key word(s) in a search request to a search engine, by the subject matter of a web-site/web page to which the user links or onto which the user logs-in. Depending on the nature of the user (e.g., type of user device being used, such as a desktop PC), the user might have to opt in to the use of location information, but for most users this should not be a big concern. Additional external accessing amount/trend sources, such as Twitter, or other social networking systems with available data regarding users, could also be brought to bear. Again, this may require in some instances some form of opting in, which may add means of defining a target market with even greater granularity, such as, by obtaining user profiles and/or historical use data.

According to aspects of an embodiment of the disclosed subject matter the system 10 may utilize known techniques such as rule-based systems and collaborative filtering to analyze all the accessing information and to thereby define a target market and then to select users, locations, media and the like to which or through which to deliver appropriate advertisement(s) to the target advertising market.

The system could learn as it goes, for example, if a user(s) in the targeted market clicks through on the displayed advertisement, sent as a result of the use of the claimed subject matter, that information can be used to reinforce the target market and/or delivery choices made by the system 10. This may be done in an ongoing fashion, such that, if only a relatively small number of users are reacting to the delivery of the advertisement in a certain geographic area, or after the passage of some measurable time, or over a certain selected media, then the delivery of the advertisement could be modified or cancelled where it is being demonstrated to not be effective or be relatively less effective. Similarly positive user feedback information could lead to extending the target market 30, geographically, temporally or otherwise.

Again turning to FIG. 1, the user devices, such as, wireless mobile stations 20a, 20b, 24a, 24b, or computers 76a-c may be within an ultimately defined target market, such as a selected geographic area, such as, may be defined by the area served by the base stations 24 and 26, or otherwise, as noted above. The users may be so accessing within a selected time period, such as may be determined by use of the user device(s) 20a, 20b, 24a, 24b, 76a-c, etc. within the defined target market geographic area 30 within the last 30 minutes, or otherwise, as noted above. The accessing users gathering pertinent consumer information, as discovered by the server 50, may also be further defined by some form of user history or other user information, such as, a user profile, as is well understood in the art, which, as noted above, may be gathered based on prior user accessing activity within the system 10, through opting in to an advertisement notification service, whereby a registration form or the like can have been used to gather user information, etc.

It will be understood that the foregoing explanation of the potential interconnections between the user devices, networks, servers, databases and the like making up the system 10, illustrated by way of example only in FIG. 1, may have many more interconnected elements and even more interconnections between the illustratively shown elements. The system 10 of FIG. 1 is but one example of how the real time user volume or trend-driven targeted advertising system 10 of the presently disclosed subject matter may work. The illustrated system 10 is presented only for the purpose of illustrating one possible embodiment of the system 10 of the disclosed and claimed subject matter, to explain how the claimed subject matter could be implemented. Many other arrangements can be implemented, as will be understood by those skilled in the art from the disclosure in this application, and also come within the scope of the appended claims.

Also, as noted above, accessing activity may be determined in a wide variety of ways, such as, by searches for the term "sushi" or for a given one or more specific establishments serving sushi, or log ins to a web site(s) or a web page(s) of an establishment or establishments serving sushi, etc. The accessing activity defining consumer interest could be defined in other ways with more generic keyword searching, as an example, where the users in question have in the past indicated a preference for sushi as part, for example, of a user profile, or have searched for the term "sushi" before, or logged in to a web site(s) or web page(s) of an establishment(s) serving sushi, and are now searching more generically, such as for the key work "restaurant." Weighted averages or otherwise analyzed/filtered/sorted and the like, sub-sets of these measures of accessing activity may be used, such as, weighing the specific activity relating specifically to the term "sushi" more heavily than the inferred activity from the more generic term "restaurant," perhaps limited to individual users by other data about the user, such as, personal profiles or prior activity, as noted above.

"Normal" may be determined also in a wide variety of ways such as some number derived from historical data for a given accessing search or log-in topic, such as "sushi." Normal may be determined by more recent activity such as within the last week, or the last several Saturday evenings, or the like, or even more recent, such as in the last given number of minutes. Weighted averages or other culling and analyzing of these numbers may also be used.

The accessing activity defining consumer interest may also be analyzed by geographic area, specific venue, specific time, as noted above, such as the city of Sunnyvale, the HP Arena, within ten minutes after the Sharks game has ended, and the like. Seasonal averaging, such as selected time periods leading up to Mother's Day, or certain time periods on the Friday before Mother's Day, etc.

In short, the information available can be analyzed to determine a consumer information seeking volume or trend, such as, a high number of users (e.g., absolute number above some threshold value) or at least a number of users that is above "normal," however normal may be defined, for the given definable target market, e.g., geographically, in a definable area in and around the HP Arena in San Jose, have been looking for sushi restaurants, over some definable prior time period, e.g., since the Sharks game ended fifteen minutes ago. Another example could be that the information available indicated that today, and perhaps more specifically, since the end of the normal work day, on the Friday before Mother's Day, a high, or at least not normal, volume of users in the downtown area of San Jose are looking for flower shops. Again, "normal" may be detected from historical activity on past Mother's Days around the same time in San Jose, or, by way of another example, may be normalized by a broader geographic area at the present time, such that the activity, e.g., in down town San Jose or in Sunnyvale can be measured against similar activity in all of Silicon Valley, to detect the higher than "normal" volume or a trend to a higher than normal volume in downtown San Jose, or in Sunnyvale, etc.

The reverse of this may also be done, e.g., determining that the consumer information gathering, such as user accessing activity volume or trend, is below some value, may be used to selectively not direct advertising to a defined target market where, apparently, as detected and measured, as noted above, interest in the particular product/service being advertised is low or below normal.

Some part or all of this accessing activity volume or trend information may be gathered by one or more of the base stations 22, 26, the mobile communication system server 50 or otherwise. The respective gathering of accessing activity volume or trend information may be stored in one or more of the databases 52, 54 for analysis and for historical reference for use at a later time to determine normal activity and trends above or below normal activity and the like analysis.

The gathering and processing of the accessing activity volume and trend information may be split up amongst elements in the system 10. The network communications server 50 may accumulate relevant data from the user devices, such as mobile communication stations 20a and 20b and others, served or being served by the base station 22, and store the data in one or the other or both of the databases 52, 54 and process the data with processor 56. Other communications servers (not shown) may accumulate relevant data from the user devices, such as mobile communication stations 24a and 24b and others, served or being served by the base station 26, and stored in other databases (not shown).

Therefore, the functionalities defined above may be spread among other elements (not shown for simplicity purposes) for gathering the information about consumer interest indicating activities, storing the data, analyzing the data, defining a target advertising market(s) and then selecting appropriate advertising that can effectively exploit the indication of consumer interest within the defined target advertising market and then delivering the advertising. This all may be combined with well known systems for an advertisement publisher, such as the server 50, to solicit advertisers to exploit the availability of a target advertising market that appears receptive to the advertiser's particular advertisement(s). Many other variations are also possible, such as, brokering the availability of a target advertising market for a given type of advertisement, or automatic publishing of advertisements for advertisers that have previously signed up to have a given advertisement published upon there being shown to exist a target advertising market, according to aspects of embodiments of the disclosed subject matter, that meets some threshold requirement(s).

Figure 2:
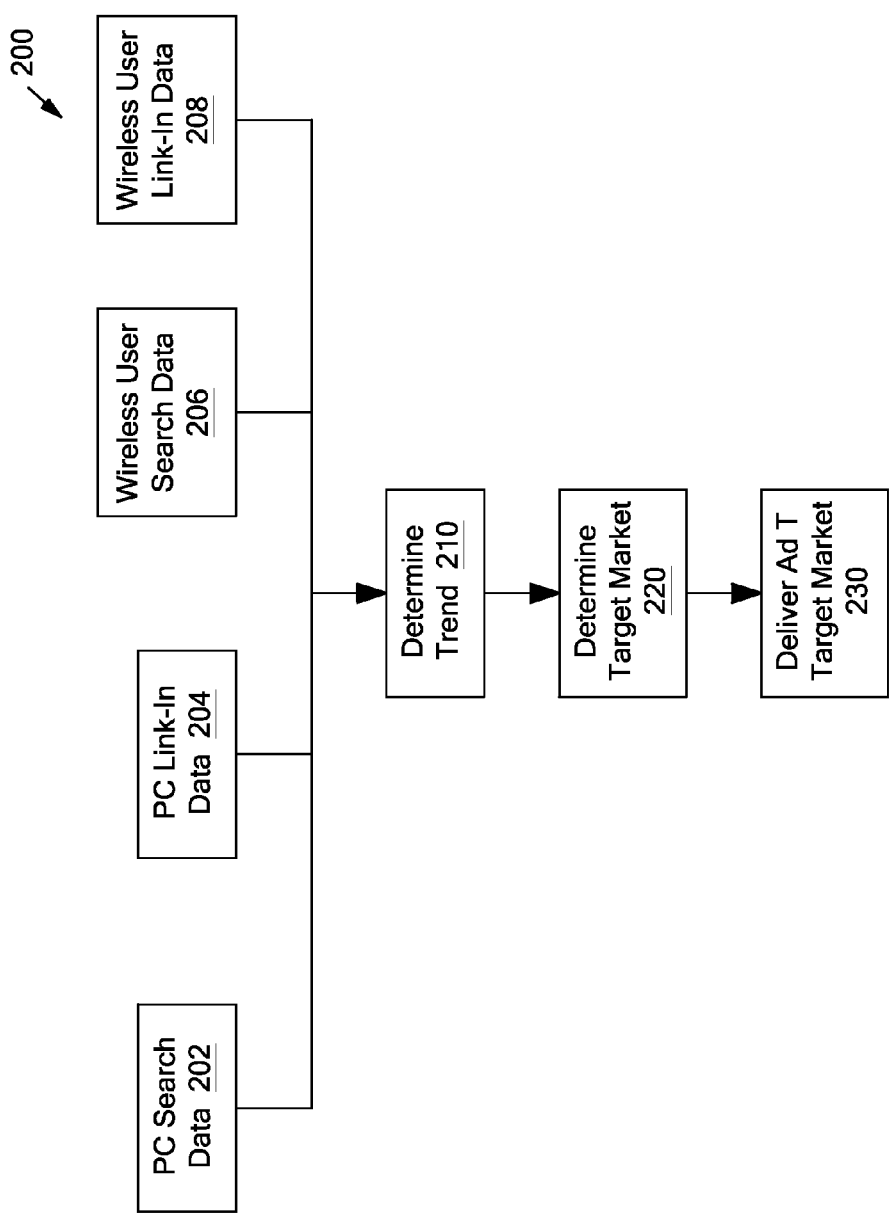
FIG. 2 shows a block diagram of a process flow according to aspects of embodiments of the disclosed subject matter.

Turning now to FIG. 2 there is shown a process flow diagram according to an aspect of an embodiment of the disclosed subject matter. In FIG. 2, the process flow 200 includes the step of, with at least one computing device, collecting data relating to consumer information gathering, such as accessing activity, such as key work searching from computing devices (block 202), log-in/link-to accessing activity (block 204), wireless user, such as wireless telephone user, key work searching (block 206) and wireless user log-on/link-to accessing activity (block 208), among others. In block 210 the process flow 200 includes determining consumer information gathering, such as, accessing activity, volume or trend, such as, an abnormal amount of accessing regarding sushi or sushi serving restaurants in the area of the HP Arena in the last minute since the Sharks hockey game ended. In block 220 a defined target market is defined, such as within walking distance of the HP Arena for the next fifteen minutes. In block 230 a sushi related advertisement(s), including, e.g., a display advertisement(s), can be delivered by the system 10 to all identifiable users within walking distance of the HP Arena for the next fifteen minutes, or to some selected subset of all users (e.g., known sushi restaurant frequenters), but in any event most often a much larger group of such users than the ones through the accessing activity of which the target market was defined.

Figure 3:
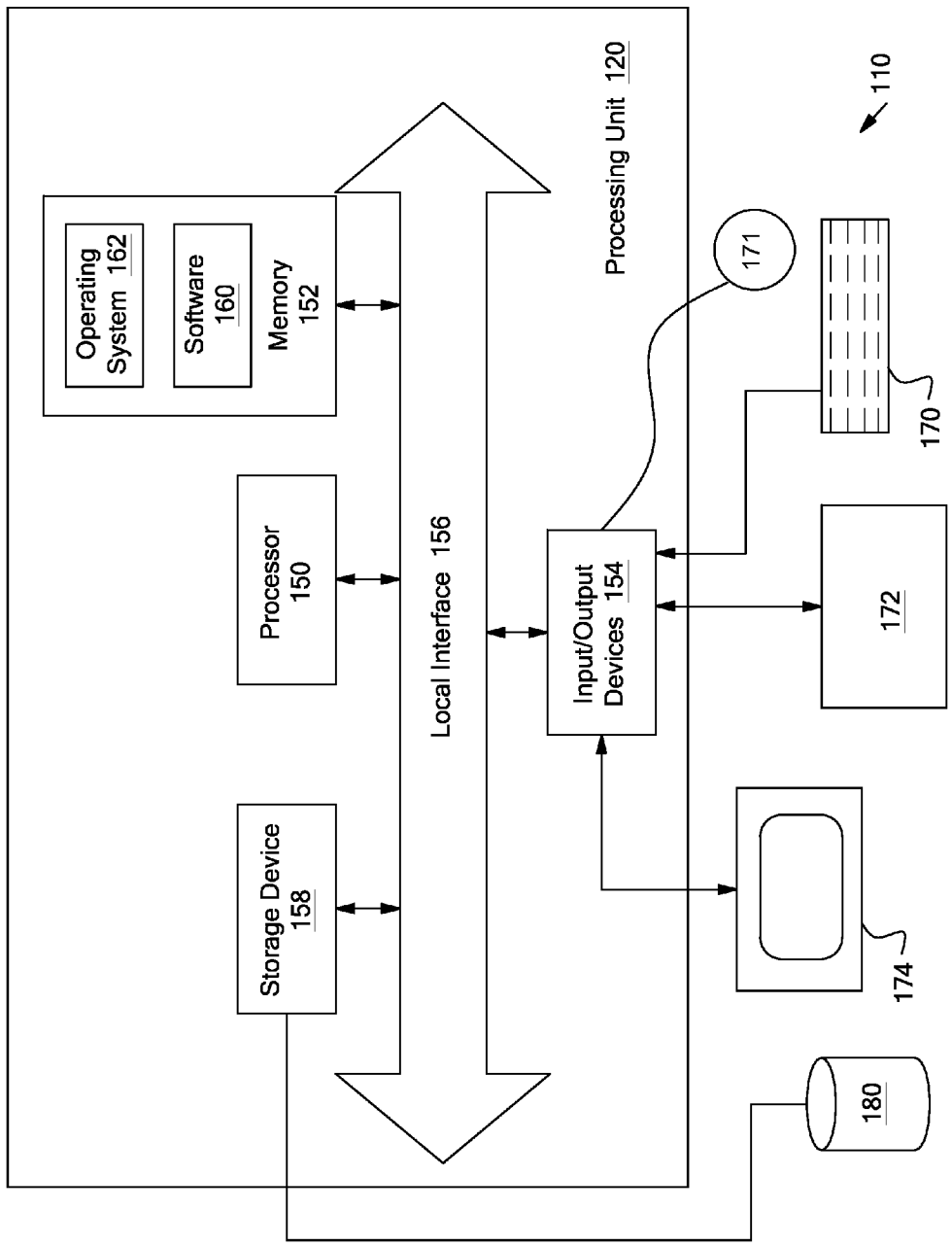
FIG. 3 illustrates in block diagram form a computing device useful with aspects of embodiments of the disclosed subject matter.

Turning now to FIG. 3 there is illustrated, by way of an example only, a "computing device" 110 which may be utilized with the system 10 of the presently disclosed and claimed subject matter. Generally, in terms of hardware architecture, as shown in FIG. 3, a computing device 110, such as the PCS 74a-c shown in FIG. 1, as a part of a real time user volume or trend-driven targeted advertising system 10, according to aspects of an embodiment of the disclosed and claimed subject matter, by way of example, may comprise a computer processor unit 120 which can include a processor 150, a memory 152, and one or more input and/or output (I/O) devices 154 (or other peripherals) that may be communicatively coupled via a local interface 156. The local interface 156 may be, for example, but not limited to, one or more buses or other wired or wireless connections. The local interface 156 may have additional elements, which are omitted for simplicity, such as controllers, buffers (caches), drivers, repeaters, and receivers, to enable communications, e.g., to data repository(ies) 158 or 180. Further, the local interface 156 may include address, control, and/or data connections to enable appropriate communications among the aforementioned components.

The processor unit 120 may be a hardware device for executing software 160, e.g., that may be stored in memory 152. The processor 150 may be any custom made or commercially available processor, a central processing unit (CPU), an auxiliary processor among several processors associated with the processing unit 120, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard, an 80×86 or Pentium series microprocessor from Intel Corporation, a PowerPC microprocessor from IBM, a Sparc microprocessor from Sun Microsystems, Inc, or a 68xxx series microprocessor from Motorola Corporation. The processing unit 120 may comprise a controller, microcontroller, or a hard wired, including firmware, device, or any combination thereof, or any other processor 150 capable of performing logic driven operations, under partly or fully programmable instructions.

The memory 152 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 152 may incorporate electronic, magnetic, optical, and/or other types of storage media. The memory 152 can have a distributed architecture, where various components are situated remotely from one another, but can be accessed by the processor unit 120, including as an example storage 158 and database(s) 180.

The software 160 in memory 152 may include one or more separate programs, each of which comprises an ordered listing of executable instructions for implementing logical functions. In the example of FIG. 2 the software 160 in the memory 152 may include instructions for performing the process flow described there, and a suitable operating system ("O/S") 162. A non-exhaustive list of examples of suitable commercially available operating systems 162 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation); or any other suitable operating system, including a customized operating system such as may come installed on a communications network base station, etc. The operating system 162 essentially controls the execution of other computer programs, such as the real time user search information gathering volume-driven or trend-driven targeted display advertising system 10, or a portion(s) thereof, such as is illustrated in FIG. 2, and provides scheduling, input-output control, file and data management, memory management, and communication control and related services.

The real time user information gathering volume-driven or trend-driven targeted advertising system 10 may be implemented in or with the use of a non-transitory computer readable medium containing a source program, executable program (object code), script, or any other non-transitory entity comprising a set of instructions to be preformed. When a source program, then the program needs to be translated via a compiler, assembler, interpreter, or the like, which may or may not be included within the memory 152, so as to operate properly in connection with the O/S 162. Furthermore, the real time user volume-driven or trend-driven targeted advertising system 10 or individual portions thereof may be written as (a) an object oriented programming language, which has classes of data and methods, or (b) a procedure programming language, which has routines, subroutines, and/or functions, for example, but not limited to, C, C++, Pascal, Basic, Fortran, Cobol, Perl, Java, and Ada or standard Internet languages, such as XML or HTML.

The I/O devices 154 may include input devices, for example but not limited to, a keyboard 170, mouse 171, printer/scanner 172, microphone (not shown), touch screen 174, etc. Furthermore, the I/O devices 154 may also include output devices, for example, but not limited to, a printer/scanner 172, display 174, etc. Finally, the I/O devices 154 may further include devices that communicate both inputs and outputs, for instance, but not limited to, a modulator/demodulator (modem, not shown in FIG. 3) for accessing another device, system, or network, e.g., as illustrated in FIG. 1, a radio frequency (RF) or other transceiver (not shown in FIG. 3), a telephonic interface (not shown in FIG. 3), a bridge (not shown, in FIG. 3), a router (not shown in FIG. 3), etc. Any of the foregoing may serve to connect the computing device 110 processing unit 120 with other computing devices, sources of input/recipients of output, such as a real time user volume-driven or trend-driven targeted advertising system 10.

If the computing device 110 processing unit 120 is a PC, workstation, or the like, the software 160 in the memory 152 may further include a basic input/output system (BIOS) (omitted for simplicity). The BIOS is a set of essential software routines that initialize and test hardware at startup, start the 0/S 162, and support the transfer of data among the hardware devices. The BIOS may be stored in ROM so that the BIOS can be executed when the computing device 110 processing unit 120 is activated.

When the computing device 110 processing unit 120 is in operation, the processor 150 may be configured to execute software 160 stored within the memory 152, to communicate data to and from the memory 152, and to generally control operations of the computing device 110 processing unit 120 pursuant to the software 162. The real time user volume-driven or trend-driven targeted advertising system 10 and the O/S 162, in whole or in part, but typically the latter, may be read by the processor 150, perhaps buffered within the processing unit 120, and then executed.

When the real time user volume-driven or trend-driven targeted advertising system 10 is implemented in software, it should be noted that the real time user volume-driven or trend-driven targeted advertising system 10 software can be stored on any computer readable medium, as defined above, for use by or in connection with any computing device 110 related system or method.

It will be understood by those skilled in the art that the foregoing discloses a system, method and software stored on a computer readable medium, for performing a method for delivering a selected advertisement to a target market, which may comprise collecting data relating to consumer information gathering, such as accessing information; analyzing the data relating to consumer information gathering to determine an indication of consumer interest, such as an accessing volume amount or trend toward an accessing volume amount; utilizing the indication of consumer interest to define a target advertising market, such as by geographical area and time period; and utilizing at least one communications channel delivering a selected advertisement related to the target advertising market to user devices within the target advertising market. The define a target market step can serve to define the target market at least by presence of a selected user device or group of devices, such as, by known location, by access provided through a known source, such as a remote user device base station, etc., within the target market and a selected time period. The define a target market step can serve to define the target market at least by information regarding a selected user device user, other than presence of the selected user device within the target market, and collected prior to the time of carrying out the define a target market step, such as through user activity history, a user profile, etc. The data relating to consumer information gathering can be identification of consumers using user devices identifiable to a consumer location to search on the Internet for a selected topic. or to log-in or link-to a web-site or web-page. The at least one selected communications channel can be capable of being used to deliver the selected advertisement only to user devices within the target market, such as by URL address, or by base station service area, or by email address, or the like.

It should be understood that the embodiment(s) described herein are merely exemplary and that a person skilled in the art may make many variations and modifications without departing from the spirit and scope of the invention. All such variations and modifications are intended to be included within the scope of the claimed subject matter.

Furthermore, the embodiments or methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is shared, altered or otherwise changed and in which sub-operations described as being part of a larger operation are performed independently and perhaps even generally at the same time.

We claim:

1. A method of delivering a selected advertisement to a target advertising market, comprising:
   with at least one computing device, collecting data relating to consumer information gathering, wherein the data corresponds to search requests from a first set of user devices corresponding to a first set of users, wherein the search requests from the first set of user devices correspond to a time period and a location;

analyzing, by the least one computing device, the data relating to consumer information gathering;

determining an indication of consumer interest that corresponds to the time period and the location;

defining, by the at least one computing device, the target advertising market utilizing the indication of consumer interest, wherein the target advertising market is at least partially based on the time period and the location;

identifying, by the least one computing device, a second set of user devices that corresponds to the target advertising market, the second set of user devices corresponding to a second set of users, each of the second set of users being different from each of first set of users, wherein the determining of the indication of consumer interest was not based on the second set of users;

identifying, by the least one computing device, the selected advertisement at least partially based on one or more of the time period, the location, and/or the target advertising market; and transmitting, by the at least one computing device, the selected advertisement via at least one communication channel to the second set of user devices.

2. The method of claim 1, wherein the defining the target advertising market comprises defining the target advertising market at least by presence of a selected user device within the target advertising market and a selected time period.

3. The method of claim 1, wherein the defining the target advertising market comprises defining the target advertising market at least by information regarding a selected user device user, other than presence of the selected user device within the target advertising market, and collected prior to defining the target advertising market.

4. The method of claim 1, wherein the data relating to consumer information gathering comprises consumers using user devices identifiable to a consumer location to search on an Internet for a selected topic.

5. The method of claim 1, wherein:
the transmitting comprises delivering the selected advertisement to the second set of user devices within the target advertising market; and
the at least one communication channel is capable of being used to deliver the selected advertisement only to the second set of user devices within the target advertising market.

6. A non-transitory computer readable storage medium storing instructions for delivering a selected advertisement to a target advertising market, the instructions when executed by a computing device, perform a method comprising:
collecting data relating to consumer information gathering, wherein the data corresponds to search requests from a first set of user devices corresponding to a first set of users, wherein the search requests from the first set of user devices correspond to a time period and a location;
analyzing the data relating to consumer information gathering;
determining an indication of consumer interest that corresponds to the time period and the location;
defining the target advertising market utilizing the indication of consumer interest, wherein the target advertising market is at least partially based on the time period and the location;
identifying a second set of user devices that corresponds to the target advertising market, the second set of user devices corresponding to a second set of users, each of the second set of users being different from each of first set of users, wherein the determining of the indication of consumer interest was not based on the second set of users;
identifying the selected advertisement at least partially based on one or more of the time period, the location, and/or the target advertising market; and
transmitting a selected advertisement via at least one communication channel to the second set of user devices.

7. The non-transitory computer readable storage medium of claim 6, wherein the defining the target advertising market comprises defining the target advertising market at least by presence of a selected user device within the target advertising market and a selected time period.

8. The non-transitory computer readable storage medium of claim 6, wherein the defining the target advertising market comprises defining the target advertising market at least by information regarding a selected user of a user device, other than presence of the selected user device within the target advertising market, and collected prior to defining the target advertising market.

9. The non-transitory computer readable storage medium of claim 6, wherein the data relating to consumer information gathering comprises consumers using user devices identifiable to a consumer location to search on an Internet for a selected topic.

10. The non-transitory computer readable medium of claim 6, wherein the at least one communication channel is capable of being used to deliver the selected advertisement only to user devices within the target advertising market.

11. A system for delivering a selected advertisement to a target market, comprising:
a computing device configured to:
collect data relating to consumer information gathering, wherein the data corresponds to search requests from a first set of user devices corresponding to a first set of users, wherein the search requests from the first set of user devices correspond to a time period and a location;
analyze the data relating to consumer information gathering;
determine an indication of consumer interest that corresponds to the time period and the location;
define a target advertising market utilizing the indication of consumer interest, wherein the target advertising market is at least partially based on the time period and the location;
identify a second set of user devices that corresponds to the target advertising market, the second set of user devices corresponding to a second set of users, each of the second set of users being different from each of first set of users, wherein the determining of the indication of consumer interest was not based on the second set of users;
identify the selected advertisement at least partially based on one or more of the time period, the location, and/or the target advertising market; and
transmit, via at least one communication channel, a selected advertisement to the second set of user devices.

12. The system of claim 11, wherein the defining the target advertising market comprises defining the target advertising market at least by presence of a selected user device within the target advertising market and a selected time period.

13. The system of claim 11, wherein the defining the target advertising market comprises defining the target advertising market at least by information regarding a selected user device user, other than presence of the selected user device within the target advertising market, and collected prior to defining the target advertising market.

14. The system of claim 11, wherein the data relating to consumer information gathering comprises consumers using user devices identifiable to a consumer location to search on an Internet for a selected topic.

15. The system of claim 11, wherein the at least one communication channel is capable of being used to deliver the selected advertisement only to user devices within the target advertising market.

16. The method of claim 1, wherein the analyzing the data relating to consumer information gathering comprises comparing the data to a threshold number of search requests.

17. The method of claim 16, wherein:
the search requests from the first set of user devices correspond to a topic; and
the threshold number of search requests correspond to the topic.

18. The method of claim 17, wherein the threshold number of search requests is at least partially derived from historical data corresponding to the topic.

19. The method of claim 1, wherein the determining an indication of consumer interest that corresponds to the time period and the location comprises identifying, at least partially based on the data, a trend of search requests that corresponds to one or both of the time period and the location.

* * * * *